United States Patent [19]

Pak

[11] Patent Number: 4,884,973
[45] Date of Patent: Dec. 5, 1989

[54] MATHEMATIC TEACHING AID

[76] Inventor: Kyoungsik Pak, 371 Sweetbriar Rd., King of Prussia, Pa. 19406

[21] Appl. No.: 298,168

[22] Filed: Jan. 18, 1989

[51] Int. Cl.⁴ .......................... G09B 1/10; G09B 19/02
[52] U.S. Cl. .................................... 434/191; 434/203; 434/205
[58] Field of Search ............... 434/191, 192, 193, 200, 434/203, 204, 205, 206, 209, 210

[56] References Cited

U.S. PATENT DOCUMENTS

| 456,708 | 7/1891 | Preston . | |
|---|---|---|---|
| 480,164 | 8/1892 | Barrett | 434/192 |
| 1,257,655 | 2/1918 | Walden . | |
| 1,323,986 | 12/1919 | Joyce . | |
| 1,354,707 | 10/1920 | Waterhouse . | |
| 1,392,578 | 10/1921 | Jones . | |
| 1,441,323 | 1/1923 | Barber . | |
| 1,694,405 | 12/1928 | Troidl . | |
| 2,228,554 | 1/1941 | Brown . | |
| 2,476,580 | 7/1949 | Bergman | 434/206 |
| 2,899,756 | 8/1959 | Wise . | |
| 3,267,590 | 8/1966 | Browning . | |
| 3,374,559 | 3/1968 | Smith, Jr. | 434/209 X |
| 3,430,362 | 3/1969 | Jacobson . | |
| 4,176,472 | 12/1979 | DeVanney | 434/203 |
| 4,379,700 | 4/1983 | Pollock . | |
| 4,452,588 | 6/1984 | Smith . | |

Primary Examiner—William H. Grieb
Attorney, Agent, or Firm—Howson and Howson

[57] ABSTRACT

An aid for teaching children addition and subtraction of two numbers according to an algebraic equation. Cards bearing selected integers and one card bearing a plus or minus sign are placed by the teacher on a panel in horizontally aligned spaces corresponding to the terms of the equation but for one space. The student is then challenged to hang a card displaying the appropriate integer or sign in the vacant space. Rings slidable on a horizontal rod are positionable in the spaces in quantities corresponding to the integers thereat for visual reinforcement of the equation.

4 Claims, 1 Drawing Sheet

MATHEMATIC TEACHING AID

The present invention relates to educational devices, and more particularly to an aid for teaching children abstract principles of mathematics.

BACKGROUND OF THE INVENTION

Various methods of teaching children and others basic abstract concepts of mathematics such as addition and subtraction have been suggested and successfully applied in the educational process. The particular method used often depends upon the age, attention span, ability and interests of the student. Very young, preschool children are particularly receptive to teaching methods which include visual reinforcement and associative learning principles. Such reinforcement is especially enhanced when it permits playful touching and manipulation of amusing and colorful parts of a game or toy. These physical parts, when correlated with a mathematical problem to be solved, extends a childs attention span, increases his enthusiasm, and mentally links physical elements with an expression of the problem to reinforce and improve comprehension.

A common means for stating a mathematical problem is the algebraic equation which expresses a mathematical equality between two quantities as shown by an equal mark. In one of its more simple forms suitable for introducing this concept to small children, is the addition or subtraction of two integers to equal their sum or difference. Heretofor, there has been no teaching aid suitable for associative learning and visual reinforcement of such algebraic expressions which is easy to understand and appealing to very young children. Such devices have been either too complex and confusing or unappealing to the child, especially after extended use.

SUMMARY OF THE INVENTION

Accordingly, it is an object of the present invention to provide an mathematic teaching aid for associative learning of addition and subtraction by algebraic expressions.

Another object is to provide an educationl device which visually reinforces concepts of addition and subtraction within an algebraic expression.

Still another object is to provide an educational device which provides many movable parts for maintaining a child's attention span over a relatively long period.

A further object is to provide an educational device which is inexpensive to manufacture and produce, which can be safely used by children with little or no supervision, and which is entertaining to very young children.

Briefly, these and other objects of the invention are accomplished with numbered cards formed to be hung on a panel with pegs horizontally aligned at positions corresponding to the general equation $A + \text{or} - B = C$. The equal sign is permanently affixed to the panel and a card bearing the sign + or − is hung between cards representing the terms A and B. By hanging a selected combination of cards bearing two integers and one sign, or three integers, at three of the four positions, a student is challenged to place an appropriate card at the remaining position to complete the equation. A rod above and extending along the length of the peg alignment includes a quantity of slidable rings. By placing given numbers of rings above selected pegs, the student is challenged to hang a card with the appropriate integer below them. Conversely, the student may be challenged to place the appropriate number of rings above the corresponding integer.

BRIEF DESCRIPTION OF THE DRAWING

For a better understanding of these and other objects and aspects of the invention, reference may be made to the following detailed description taken in conjunction with the accompanying drawing wherein.

DESCRIPTION OF THE PREFERRED EMBODIMENT

Figure 1:
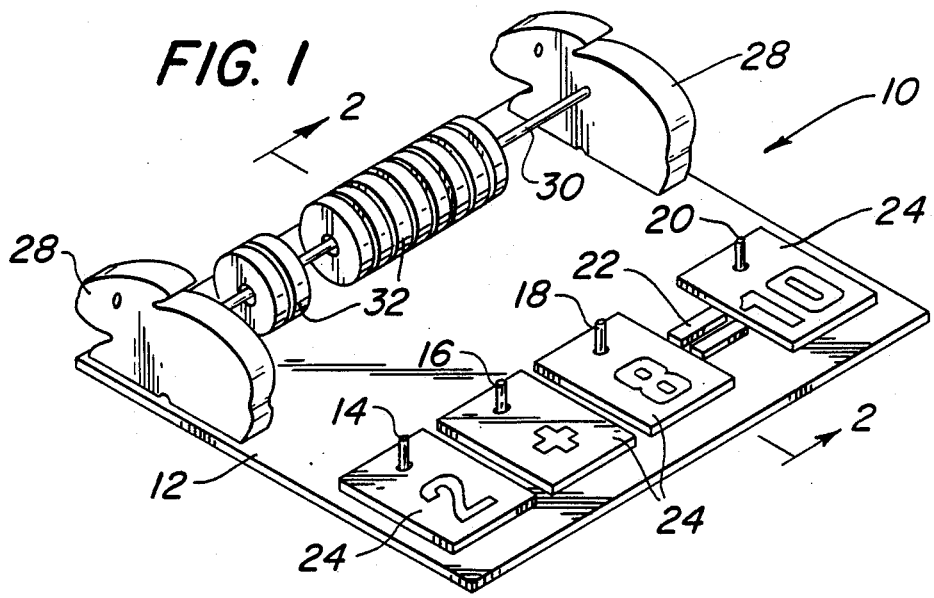
FIG. 1 is an isometric view of a mathematic teaching aid according to the invention set up in a typical learning configuration.
Figure 2:
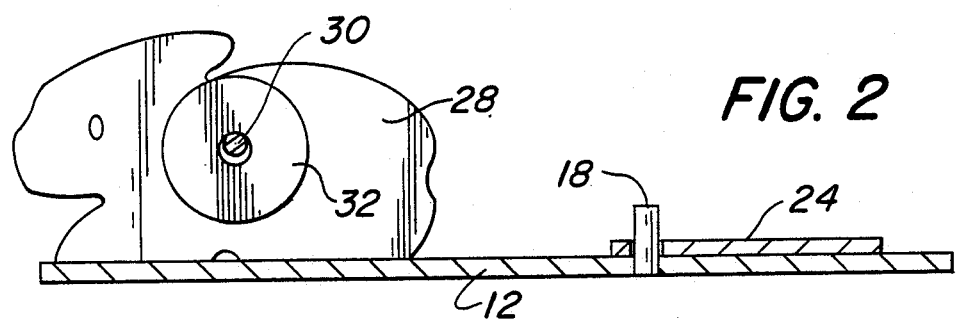
FIG. 2 is a cross-sectional view of the aid taken along the line 2—2 of FIG. 1.

Referring now to the drawing wherein like characters designate like or corresponding parts throughout the several views, there is shown in FIG. 1 an mathematic teaching aid 10 forvisually illustrating an algebraic expression of equaliLy, as shown by the equal mark, between two quantities, one being the addition or subtraction of two terms and the other being the resultant sum or difference. Aid 10 includes a flat rectangular panel 12 having four pegs 14, 16, 18 and 20 spaced apart on a straight line parallel to lower edge of panel 12 for hanging cards 24. An equal sign 22 is affixed to board 12 between pegs 18 and 20. Although only four cards 24 are illustrated, there is a total of eleven cards 24 required for use in the preferred embodiment of FIG. 1. All components of aid 10 may be constructed of a variety of lightweight rigid materials such as plastic, wood, composition board or the like, and colorfully painted or coated.

Figure 3:
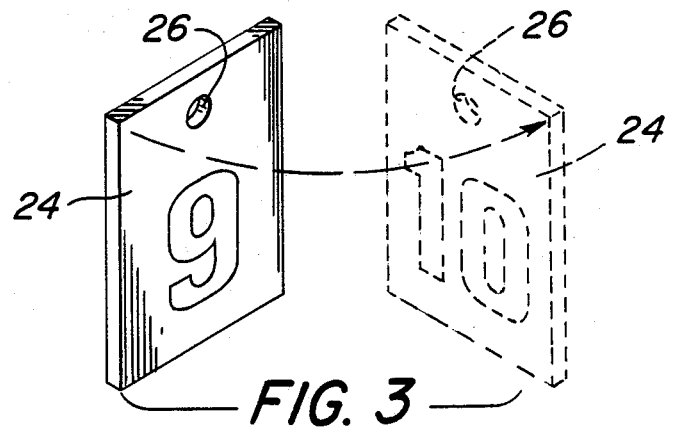
FIG. 3 is a typical card employable in the aid of FIG. 1 bearing the integer 9 on one side and, as shown in dotted outline, the integer 10 on the other side.

Referring to FIG. 3 each card 24 is preferably rectangular and of the same color but different from panel 12. A hole 26 in each card 24 allows it to be hung on any peg 14, 16, 18 or 20. Ten of the cards 24 each bears a discrete integer from 1 to 10 on one side and a different discrete integer from 1 to 10 on the other side. The remaining card 24 bears a + (plus) sign on one side and a − (minus) sign on the other. This arrangement of integers and signs is further illustrated in the following table.

| Card No. | Card Integers or Signs | |
|---|---|---|
| | Front Face | Back Face |
| 1 | 1 | 10 |
| 2 | 2 | 1 |
| 3 | 3 | 2 |
| 4 | 4 | 3 |
| 5 | 5 | 4 |
| 6 | 6 | 5 |
| 7 | 7 | 6 |
| 8 | 8 | 7 |
| 9 | 9 | 8 |
| 10 | 10 | 9 |
| 11 | + | − |

The number of cards and range of integers associated with the teaching aid may vary. The complexity obviously increases with the number and range making the aid more challenging. For example, eleven cards bearing the integers 0 and 11-20 may be added for older children. It is also contemplated that cards bearing signs of additional functions such as × for multipling and ÷ for dividing may be added; and their colors or shapes varied for hanging on specified pegs. Other algebraic expressions may also be included which add terms or functions for teaching more advanced students.

A visual representation of the equation can be manually presented above the cards hung on pegs 14, 16, 18 and 20. A pair of brackets 28 at either side of panel 12 support the ends of a rod 30 on which there are ten rings 32 slidable along the length of rod 30. Brackets 28 are preferably colorful cutLuts of storybook characters or animals such as a rabbit, and rings 32 are brightly colored to contrast with the colors of panel 12 and cards 24. For an embodiment having as many as twenty integers, two parallel rods 30 with a set of ten rings on each rod are possible. One set, for example, could correspond to the integer at peg 14 and another set with the integer on peg 18. Again, many combinations and permutations of card numbers, ring positions are possible for representing the many algebraic expressions.

Various ways in which a teaching aid according to the invention can be used will now be exemplified with reference to FIG. 1. In one, the teacher hangs cards 24 to display integers 2 and 8 on pegs 14 and 18, and the + sign on peg 16. The student is then challenged to separate the rings 32 into two quantities corresponding to the integers 2 and 8 and to hang a card 24 on peg 20 with an integer, i.e. 10, corresponding to the sum of integers 2 and 8. In another ethod, the teacher divides the rings 32 into two groups of two and eight rings, respectively, and challenges the student to hang cards 24 on pegs 14 and 18 having integers, e.g. 2 and 8, corresponding to the two groups. In another, the teacher hangs cards 24 with the integer 2, + sign and integer 10. on pegs 14, 16 and 20, respectively, and challenges the student to hang a card 24 on peg 18 with the appropriate integer, e.g. 8.

It should now be apparent there are a myriad of combinations of mathematical expressions for challenging a student. These combinations become even more numerous with increasing numbers of cards 24, rings 32 and mathematical operators. The advantages and novel features are therefore readily apparent. For example, an entertaining device is provided for extending the attention span of a student during an associative learning process of abstract mathematical concepts such as an algebraic expression of addition and subtraction. The aid also provides a hands-on interface of an educational device which can be safely manipulated by children with little or no supervision, and which visually reinforces concepts, such as addition and subtraction within an algebraic expression. The aid also is extremely simple to learn, and inexpensive to manufacture and produce.

It should be understood that the invention may take still other forms without departing from the essential characteristics thereof. The disclosed embodiment is in all respects illustrative and not restrictive, the scope of the invention being according to the appended claims. Any cLanges which come within the meaning and range of equivalency of the claims are therefore intended to be included therein.

I claim:

1. Apparatus for visually representing an algebraic equation comprising, in combination:
   a panel having a plurality of connectors aligned at positions corresponding to the terms of the equation, and bearing an equal sign between the penultimate and lastconnectors; and
   cards formed to engage selected ones of said connectors, at least one of saidcards bearing the sign of a mathematical operator and the remainder bearing discrete integers.

2. Apparatus according to claim 1 further comprising:
   a rod fixed to said panel adjacent to and coextensive with said connectors and
   members supported by said rod and manually slidable to positions along the length thereof corresponding to the integers displayed by said cards.

3. Apparatus for teaching addition and subtraction of two numbers represented by the equation, comprising, in combination:
   a panel having first, second, third and fourth connectors aligned at positions corresponding to A, + or −, B and C, respectively, of the equation and bearing an equal sign between said third and fourth connectors;
   a quantity of first cards formed to engage selected ones of said first, thirdand fourth connectors with either side hidden from view, each of said first cards bearing a discrete integer on one side from zero to the quantity and bearing a discrete integer from zero to the quantity on the other side different from the integer on the one side; and
   a second card formed to engage said second connector with either side hidden from view, said second card bearing a plus sign on one side and a minus sign on the other side;
   whereby display of any combination of two integers and one sign or of three integers of said cards at three of said connectors challenges a student to display an appropriate integer or sign of said cards at the remaining one of said connectors to complete the equation.

4. Apparatus according to claim 1 further comprising:
   a rod fixed to said panel adjacent to and coextensive with said connectors; and
   a quantity of rings supported said rod and manually slidable along the thereof, the quantity of said rings being equal to the quantity of said first cards;
   whereby said rings can be positioned along the length of said rod in numbers corresponding to the integers displayed at said first, third and fourth connectors.

* * * * *